Patented Jan. 26, 1932

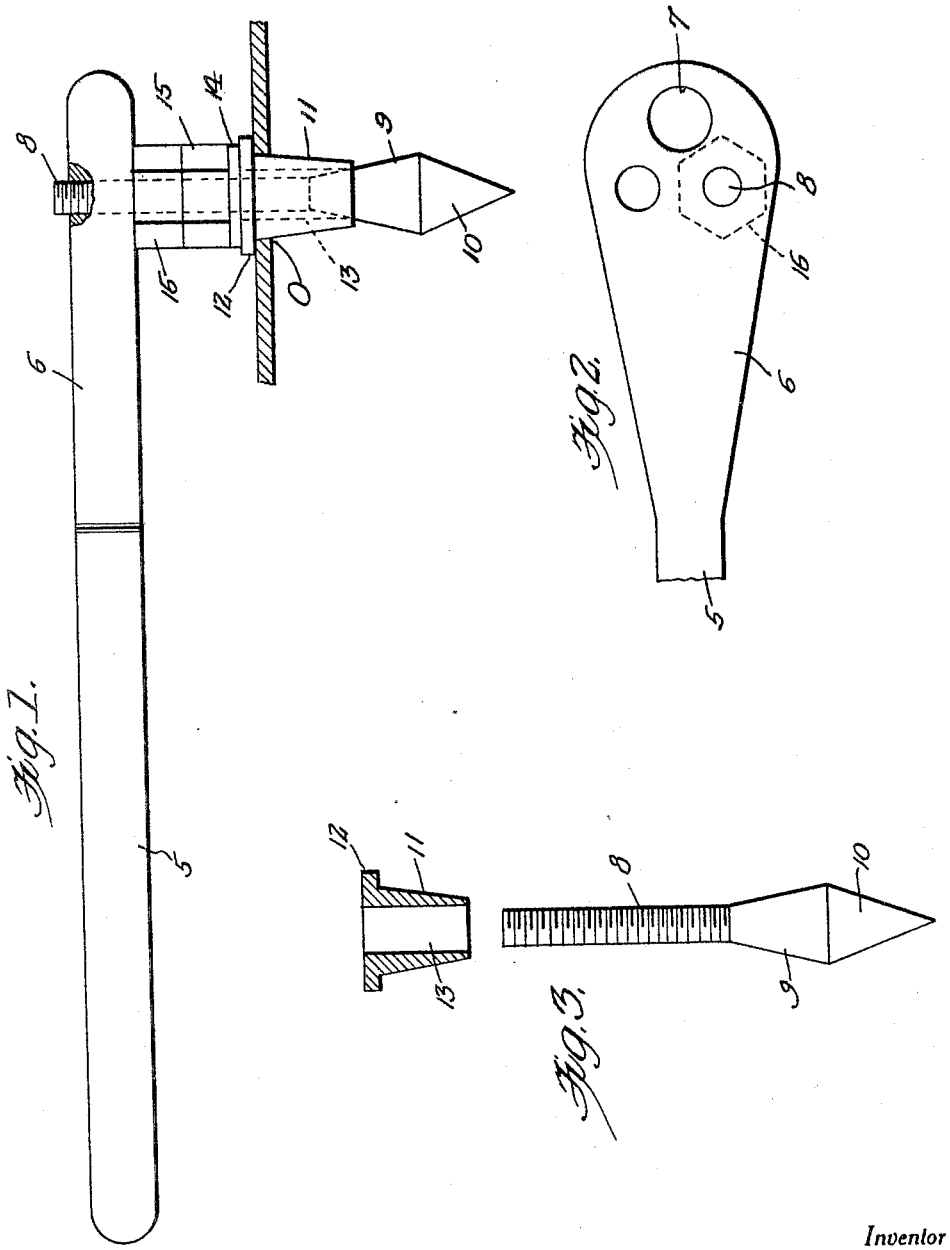

1,842,698

UNITED STATES PATENT OFFICE

CHARLES HENRY STITT, OF RIMERSBURG, PENNSYLVANIA, ASSIGNOR OF ONE-THIRD TO SAMUEL F. SHOUP, OF RIMERSBURG, PENNSYLVANIA

DEVICE FOR PLUGGING HOLES IN GAS LINES AND THE LIKE

Application filed May 23, 1930. Serial No. 455,125.

This invention relates to a device for plugging holes in gas lines, tanks or the like, and the primary object of the invention is to provide a plug insertible in the hole together with expansion means for expanding the plug while in the hole for plugging the hole and consequently stopping the leak.

A still further object of the invention is to provide a device of the above-mentioned character which is simple in construction, inexpensive, consists of comparatively few parts, easy to manipulate, practical, strong, durable, and well adapted for the purpose designed.

Other objects and advantages of the invention will become apparent during a study of the following description, taken in connection with the accompanying drawings wherein:—

Figure 1 is a side elevational view of my improved device, certain parts being broken away.

Fig. 2 is a fragmentary top plan view thereof.

Fig. 3 is a detail view of the expansion bolt and plug, the expanding bolt being shown in elevation and the plug separate from the bolt and is shown in vertical cross section.

With reference more in detail to the drawings, it will be seen that 5 indicates a handle enlarged at one end to provide a head 6. The head 6 is provided with a plurality of openings 7 each of a different diameter to accommodate shanks of varied diameters as will be apparent.

An expanding bolt comprises an elongated threaded shank 8 provided at one end with an expanding head, the said head comprising an upper conical portion 9 and a lower conical portion 10. The upper conical portion 9 at the apex portion thereof merges into the shank 8 as clearly suggested in Fig. 3.

In actual practice a tapered plug 11 made of soft metal is provided at its upper or largest end with an outstanding flange 12. The plug 11 has an axial bore 13 extending therethru for slidably accommodating the shank 8. The plug 11 when mounted on the bolt will have the lower end thereof contacting with the upper conical portion 9. Next arranged on the expanding bolt is a suitable washer 14 adapted to rest on the flange 12.

Abutting the washer 14 is a jam nut 15, the jam nut 15 being interposed between the washer 14 and a pressure nut 16 threadedly engaged with the shank, the free end of the shank being then threaded into the particular opening 7 in the head 6 of the handle. It will be noted that the upper end of the shank 8 extends beyond the upper face of the head 6.

In actual practice, the plug 11 is loosely disposed about the shank 8. The nuts 15 and 16, and the washer 14 are then placed on the shank, in the relative positions suggested in the drawings, after which the handle member 5 receives in the proper aperture thereof the free end of the shank 8. The nut 16 is then threaded axially of the shank 8 to be jammed against the head of handle 5 for fixedly securing the handle on the shank against movement relative thereto. The head 10 and plug 11 are then passed thru the opening. The handle 5 is then grasped tightly in the hand, and through the medium of a suitable wrench, held in the other hand of the operator, the nut 15 is threaded axially of the shank 8 toward the work, thus causing the shank 8 to move axially with respect to the plug 11 so that the tapered end 9 of the head is drawn through the bore of the plug for expanding the latter for securely and positively plugging the hole.

The hole being plugged as just described, nut 16 is rotated to move axially of the shank 8 away from the head of handle 5 so that the handle 5 may be subsequently removed from engagement with the shank 8.

It is thought that from the foregoing description, taken in connection with the accompanying drawings, a clear understanding of the operation, utility and advantages of an invention of this character will be had by those skilled in the art without a more detailed description.

Even though I have herein shown and described the preferred embodiment of my invention, it is to be understood that the same is susceptible to changes fully comprehended by the spirit of the invention as herein described, and the scope of the appended claim.

Having thus described my invention what I claim as new is:—

In a device of the class described, a plug adapted to be inserted in an opening, a shank slidable through the plug, an expanding head provided on one end of the shank, a handle provided with a plurality of threaded openings for threadedly receiving the plug shanks of different diameters, and a pair of superimposed nuts threaded on the shank between the handle and said plug.

In testimony whereof I affix my signature.

CHARLES HENRY STITT.